May 5, 1970  W. J. ZUG  3,510,686

CONTROLLED RECTIFIER FIRING CIRCUIT

Filed Feb. 6, 1967  2 Sheets-Sheet 1

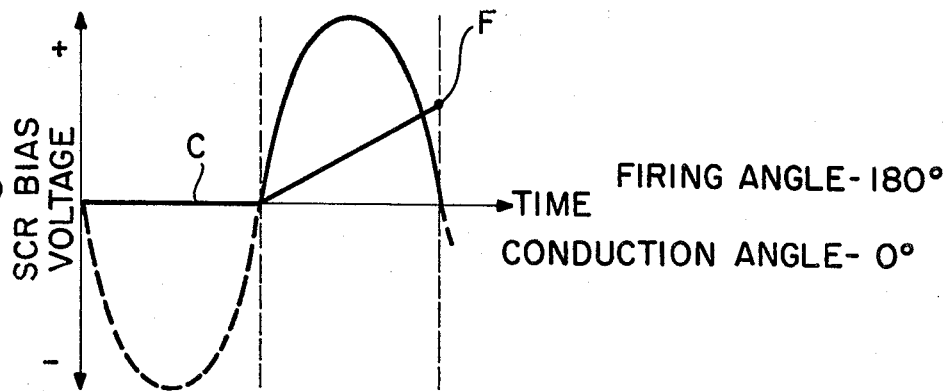
Fig.2 — FIRING ANGLE-180° CONDUCTION ANGLE-0°
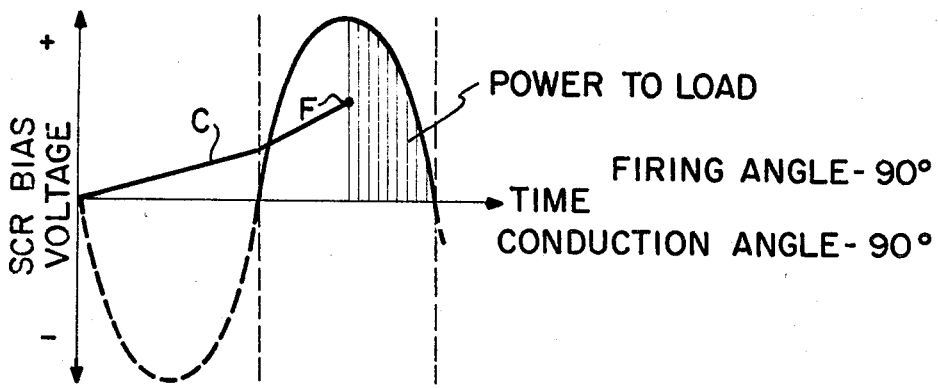
Fig.3 — POWER TO LOAD — FIRING ANGLE-90° CONDUCTION ANGLE-90°
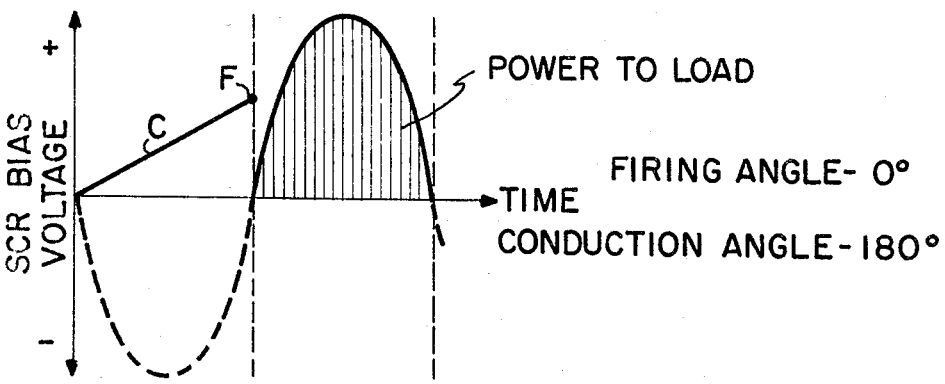
Fig.4 — POWER TO LOAD — FIRING ANGLE-0° CONDUCTION ANGLE-180°

United States Patent Office 3,510,686
Patented May 5, 1970

3,510,686
CONTROLLED RECTIFIER FIRING CIRCUIT
Wilhelm J. Zug, Raleigh, N.C., assignor, by mesne assignments, to ESB Incorporated, Philadelphia, Pa., a corporation of Delaware
Filed Feb. 6, 1967, Ser. No. 614,268
Int. Cl. H02m 5/22; H03k 17/72
U.S. Cl. 307—252                                              5 Claims

ABSTRACT OF THE DISCLOSURE

This invention provides a firing circuit which allows a full 180° firing angle phase shift. The firing pulses are triggered by the voltage across a capacitor the charging of which is controlled by synchronous switching means in such a manner that the capacitor charges at a rate proportional to a control signal during the 180° preceding the 180° firing angle excursion and at a predetermined rate during the firing angle excursion. In this way the control voltage sets the point of departure for the predetermined charging rate of the capacitor during firing angle excursion thereby controlling the firing angle phase shift.

BACKGROUND OF THE INVENTION

Firing circuits for controlled rectifier have to produce firing pulses with a fast rise time, a specific pulse width and a constant pulse amplitude at the moment of firing. In addition, such circuits must provide for a controllable phase shift of the firing angle through a full 180°. A number of different types of firing circuits and methods have been proposed including magnetic firing circuits wherein magnetic saturation produces the firing pulse, unijunction transistor firing circuits, ramp and pedestal firing control circuits and cosine wave firing circuits to mention but a few. Each of these prior art firing circuits have had certain disadvantages including high cost, the requirement of matched components and sensitivity to frequency variations.

It is an object of the present invention to provide a controlled rectifier firing circuit which will overcome the disadvantages of prior art circuits while providing the performance requirements outlined hereinbefore.

Another object of the present invention is to provide a controlled rectifier firing circuit capable of providing an accurately and repeatable control of the phase shift of the firing angle through a full 180°.

A further object of the present invention provides a controlled rectifier firing circuit which is relatively inexpensive to manufacture and does not require matched components.

SUMMARY OF INVENTION

The foregoing objects of the present invention are achieved with circuit means which include a triggering circuit which supplies a pulse to the gate of a controlled rectifier when the voltage across a capacitor reaches a predetermined value. Synchronous switching means are utilized to connect the capacitor to a source of constant voltage for charging at a predetermined rate when the controlled rectifier is forward biased and to a source of control voltage for charging at a rate proportional to a control signal when the controlled rectifier is reversed biased. In this manner, a double ramp control is provided which consists of a first variable ramp generated during the half cycle the controlled rectifier is reversed biased and a second ramp generated during the half cycle that the controlled rectifier is forward biased. The slope of the first ramp changes in accordance with the control voltage to set the point of departure for the second ramp the slope of which changes at a predetermined rate. A synchronizing circuit operated by the synchronous switching means discharges the capacitor as the controlled rectifier becomes reversed biased.

BRIEF DESCRIPTION OF DRAWINGS

A better understanding of the present invetnion may be had by the following description when read with reference to the accompanying drawings of which:

FIG. 2 is a curve illustrating the double ramp control provided by the circuit of FIG. 1 for a firing angle of 180°.

FIG. 3 is a curve illustrating the control provided by the circuit of FIG. 1 for a firing angle of 90°; and FIG. 4 is a curve illustrating the control provided by the circuit of FIG. 1 for a firing angle of 0°.

DESCRIPTION OF THE PREFERRED EMBODIMENT

Figure 1:
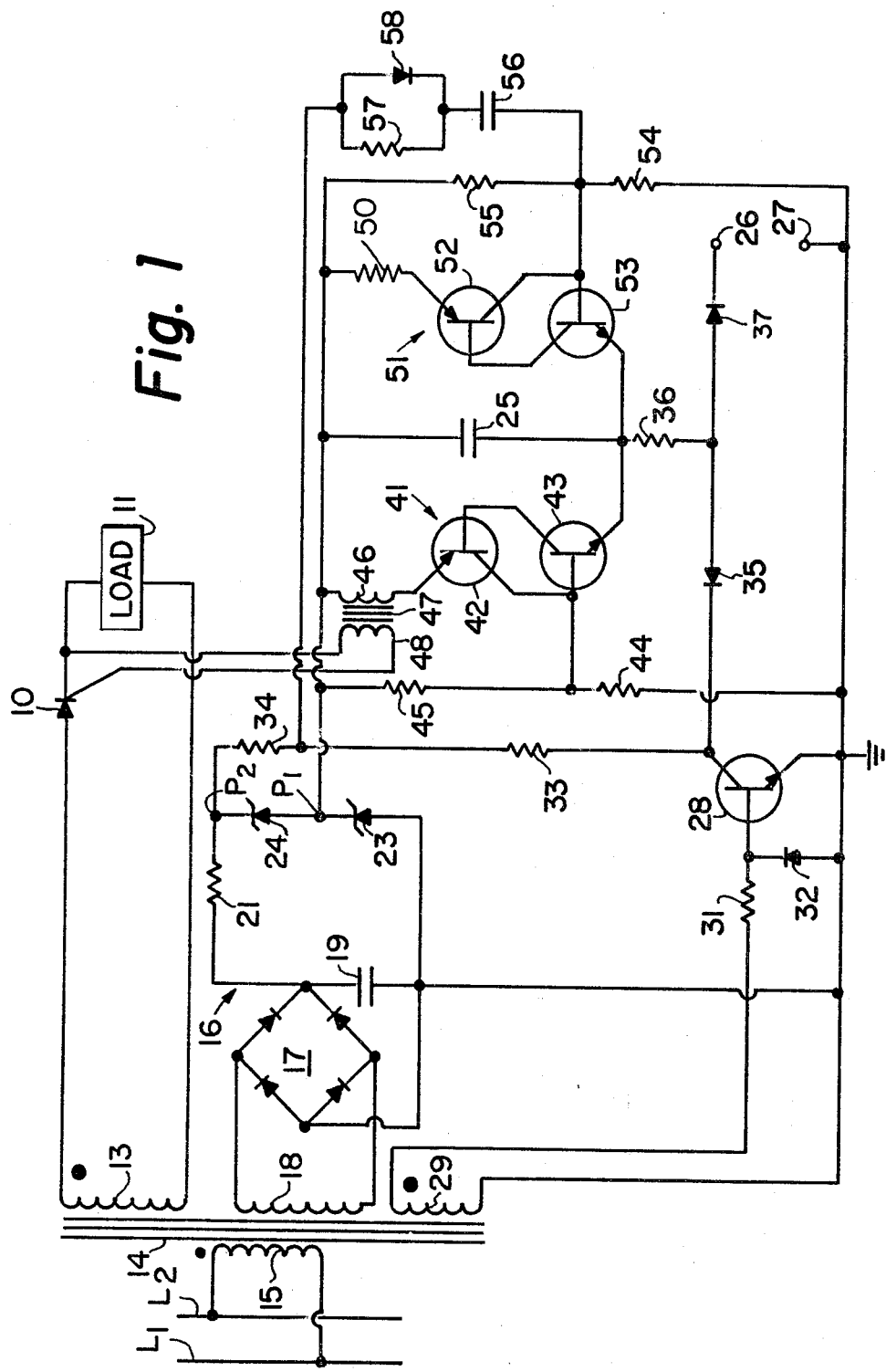
FIG. 1 is a circuit diagram of the present invention.

Referring now to FIG. 1, the numeral 10 designates a silicon controlled rectifier (SCR) having an anode, a cathode and a gate electrode. The anode and cathode of the controlled rectifier 10 are connected in series with a load 11 across a secondary winding 13 of a transformer 14. The transformer 14 has a primary winding 15 connected to a suitable source of alternating current shown here as conductors $L_1$ and $L_2$. The controlled rectifier 10 is connected to control the current flow to the load 11 in accordance with the firing angle of a triggering pulse supplied to its gate electrode by a firing circuit during the half cycle of the alternating current across the winding 13 during which it is forward biased.

The firing circuit is energized from a power supply generally designated 16 which comprises a full wave rectifier bridge 17 connected across the end terminals of a secondary winding 18 of the transformer 14. The output of the rectifier bridge 17 is filtered by means of a capacitor 19 and a resistor 21 and regulated by a pair of Zener diodes 23 and 24. The Zener diodes 23 and 24 are connected to supply a constant voltage at the junction $P_1$ of the diodes 23 and 24 and a higher constant voltage at the cathode $P_2$ of the diode 24.

During the half cycle that the controlled rectifier 10 is reversed biased, the firing circuit is adapted to charge a capacitor 25 at a rate proportional to a control signal applied across a pair of terminals 26 and 27. During the half cycle that the controlled rectifier 10 is forward biased, the firing circuit is adapted to charge the capacitor 25 at a predetermined rate. The charging of the capacitor 25 is controlled by a transistor 28 connected as a synchronous switch. The transistor 28 is an NPN transistor having the usual emitter, collector and base electrodes. The base of the transistor 28 is connected to one end terminal of a secondary winding 29 of the transformer 14 through a resistor 31 and the emitter of the transistor 28 is connected to the other end terminal of that winding. A diode 32 is connected between the emitter and base of the transistor 28. The collector of the transistor 28 is connected to the circuit point $P_2$ by a pair of resistors 33 and 34, and to the capacitor 25 through a diode 35 and a resistor 36. The control signal terminal 26 is connected to the capacitor 25 through the resistor 36 by a diode 37. The control signal terminal 27 is connected to emitter of the transistor 28.

The voltage across the capacitor 25 controls a triggering circuit generally designated 41 which is adapted to deliver a triggering pulse to the gate of the controlled rectifier 10 when that voltage reaches a predetermined value. The triggering circuit 41 comprises a pair of complementary transistors 42 and 43 connected in a bistable switching configuration. The transistors 42 and 43 are PNP and NPN transistors respectively having the usual collector, emitter, and base electrodes. The base of the transistor 43 is connected to the junction of a pair of resistors 44 and 45 which are connected to $P_1$. The emitter of the transistor 43 is connected to the junction of the capacitor 25 and resistor 36 and the collector of the transistor 43 is connected to the base of the transistor 42. The collector of the transistor 42 is connected to the base of the transistor 43 and the emitter of the transistor 42 is connected to $P_1$ through the primary winding 46 of the pulse transformer 47. The pulse transformer 47 has a secondary winding 48 which is connected between the gate and cathode of the controlled rectifier 10.

In order to set the voltage across the capacitor 25 at a constant value at or near zero when the transistor 28 is made non-conductive, a synchronizing circuit generally designated 51 is utilized. The synchronizing circuit 51 also utilizes a pair of complementary transistors 52 and 53 connected in a bistable switching configuration in shunt across the capacitor 25. The emitter of the transistor 53 is connected to the junction of the capacitor 25 and the resistor 36 and the base of the transistor 53 is connected to the junction of a pair of resistors 54 and 55 which are connected to $P_1$. The collector of the transistor 53 is connected to the base of the transistor 52 and the collector of the transistor 52 is connected to the base of the transistor 53. The emitter of the transistor 52 is connected to $P_1$ through a current limiting resistor 50. The junction of the resistors 54 and 55 is connected to the junction to the resistors 33 and 34 by means of a capacitor 56 and a resistor 57 connected in shunt with a diode 58. The resistor 57 and diode 58 protect the transistor 53 against excessive emitter-base reverse voltages.

As noted hereinbefore the controlled rectifier 10 is triggered into conduction by a pulse from the triggering circuit 41 which is in turn controlled by the voltage across the capacitor 25. The capacitor 25 can charge either through a path comprising the resistor 36 and the diode 37 from a control voltage applied across the control terminals 26 and 27 or through the resistor 36, the diode 35 and the transistor 28 when that transistor is conductive. The transistor 28 is conductive during the half cycle of the alternating current across the conductors $L_1$ and $L_2$ that the controlled rectifier 10 is forward biased. Thus, the capacitor 25 is charged at a rate proportional to the control signal applied across the terminals 26 and 27 during the half cycle that the controlled rectifier 10 is reversed biased and charge at a predetermined rate during the half cycle that the controlled rectifier 10 is forward biased. This mode of operation can be considered as a double ramp control consisting of a first variable ramp generated during 180° preceding the 180° firing angle excursion and a second fixed ramp generated from the beginning of the 180° firing angle excursion until actual firing.

FIGS. 2, 3 and 4 illustrate three typical control situations. FIG. 2 shows the control for a firing angle of 180°; FIG. 3 shows the control for a firing angle of 90°; and FIG. 4 shows the control for a firing angle of 0°. For the purposes of this explanation, the slopes of the control ramps are shown as being linear but as will be understood by those skilled in the art they are in reality exponential. The letter C indicates the control ramp or the charge on the capacitor 25 and the letter F indicates the firing point. It can be seen that the first ramp changes to set the point of departure for the second ramp. The first ramp or the control signal ramp always occurs during the 180° preceding the firing angle excursion.

The triggering circuit 41 comprises the resistors 44, 45 and 36, the capacitor 25 which form a bridge with the bistable switching configuration of transistors 42 and 43 connected across the output thereof. These components are supplied from the constant voltage at the junction $P_1$. The resistors 44 and 45 fix the voltage on the base of the transistor 43. The capacitor 25 charges through the resistor 36 when grounded either through the diode 35 or the diode 37. The junction of the capacitor 25 and the resistor 36 is connected to the emitter of the transistor 43. When the voltage across the capacitor 25 becomes equal to the voltage across the resistor 45, the transistor 43 starts to conduct and regeneratively in combination with the transistor 42 discharges the capacitor 25 into the pulse transformer 47.

The capacitor 25 can be charged by the control voltage applied between the terminals 26 and 27 through the diode 37 or from a constant potential through the transistor 28 and the diode 35. The transistor 28 acting as a synchronous switch is non-conductive during the half cycle that the control rectifier is reversed biased. During this half cycle the charging of the capacitor 25 is controlled by the control voltage applied across the terminals 26 and 27. Thus, the control voltage provides the variable ramp during the 180° preceding the 180° firing angle excursion. When this voltage is equal to the voltage between $P_1$ and ground, then no current can flow through the capacitor 25, the resistor 34 and the diode 37 and the capacitor 25 will not charge. In this case, the slope of the first ramp will be zero as shown in FIG. 2. As the controlled rectifier becomes forward biased the transistor 28 operating as a synchronizing switch becomes saturated essentially connecting the diode 35 to ground. This allows the capacitor 25 to charge through the resistor 36 and the diode 35 at a predetermined rate and provides the essentially constant slope of the second ramp. If the voltage between the control terminals 26 and 27 is approximately half the voltage of $P_1$, the capacitor 25 charges through the resistor 36 and the diode 37 as shown in FIG. 3 during the 180° preceding the 180° firing excursion. When the transistor 28 saturates and the controlled rectifier 10 becomes forward biased, the capacitor 25 is already partially charged and the capacitor discharge voltage will be reached sooner. If conversely, the voltage between the control terminals 26 and 27 is zero, the capacitor 25 can charge through resistor 36 and diode 37 to the discharge voltage and the firing angle shown in FIG. 4 will occur. Thus, by varying the control voltage, the firing angle of the circuit of the present invention can be shifted a full 180° during the 180° that the controlled rectifier is forward biased.

The synchronizing circuit 51 sets the voltage across the capacitor 25 at a constant value at or near zero as the controlled rectifier 10 enters the half cycle when it is reversed biased and the transistor 28 is made non-conductive. Since the voltage divider network comprising the resistors 54 and 55 provides a voltage between $P_1$ and the base of the transistor 53 which is larger than the voltage between $P_1$ and the base of the transistor 43, the synchronizing circuit 51 does not interfere with the normal discharge of the capacitor 25. During the half cycle that the transistor 28 is saturated, the capacitor 56 charges to the voltage difference appearing at the junction between the resistors 33 and 34 and the junction of the resistors 54 and 55. At the end of that half cycle as the transistor 28 comes out of saturation and is rendered non-conductive, the voltage at the junction of the resistors 33 and 34 rises to the potential $P_2$. The capacitor 56 follows that voltage rise and charges to a higher voltage. This causes the transistor 53 and regeneratively with the transistor 52 to form a low resistance shunt across the capacitor 25 discharging the capacitor. When the capacitor 25 is discharged the emitter of the transistor 53 rises to the potential $P_1$, which renders the bistable configuration of the transistors 52 and 53 non-conductive. In this manner the capacitor 25 is discharged and again made ready to be charged by the voltage across the control terminals 26 and 27.

By way of illustration, the following components are typical of those which can be used to construct an embodiment of the present invention as shown in FIG. 1:

| Resistors: | Ohms |
|---|---|
| 21 | 90 |
| 31 | 470 |
| 33 | 1,000 |

| Resistors: | Ohms |
|---|---|
| 34 | 3,000 |
| 36 | 51,000 |
| 44 | 5,100 |
| 45 | 5,100 |
| 50 | 22 |
| 54 | 5,100 |
| 55 | 6,800 |
| 57 | 8,200 |
| Capacitors: | Microfarads |
| 19 | 100 |
| 25 | 0.22 |
| 56 | 0.033 |
| Transistors: | |
| 28 | 2N2195 |
| 42 and 52 | 2N327B |
| 43 and 53 | 2N706A |
| Zener diodes: | |
| 23 | 1N4740 |
| 24 | 1N4736 |
| Diodes: | |
| 17, 32 and 58 | 1N3253 |
| 35 and 37 | 1N625 |
| SCR 17 | 1N1911 |

Transformer 14

| Windings: | Volts |
|---|---|
| 13 | 50 |
| 18 | 24 |
| 29 | 7 |

Pulse Transformer 47

Turns ratio—1:1
Primary and secondary impedance—1.0 mh.

From the foregoing, it can be seen that the firing circuit of the present invention provides for the control of the firing angle through a full 180° by means of a DC control voltage applied across the terminals 26 and 27. This means that the circuit is suited for numerous applications. For example, the firing circuit of the present invention is suitable for use in battery charging circuits, motor control and lighting control circuits to mention but a few. In such application a pulse shaping network could be provided for the controlled rectifier 10 and it in turn could be utilized to control the firing of larger load carrying controlled rectifiers.

The circuitry of the present invention is specifically designed to provide an accurate and reproducible firing angle without the necessity for matched components. In this respect it should be noted that the action of the triggering circuit 41 and synchronizing circuit 51 is similar to that of a unijunction transistor relaxation oscillator. In circuits of this type, however, the intrinsic standoff ratio of the transistor determines the voltage at which the capacitor begins to discharge. Because the intrinsic standoff ratio is an inherent property of such transistors, it is subject to variations due to manufacturing tolerances. Therefore, since it is essential that the value at which the capacitor 25 discharges remains contsant in order to achieve a repetitively reproducible firing angle, the utilization of unijunction transistors would require that they be matched to very close tolerances. With circuitry illustrated in FIG. 1, however, only the resistors 44 and 45 are required to be held to close tolerances in order to provide the desired accuracy. It should be noted also that since the synchronizing of the circuit of the present invention is dependent only upon the alternating current supply and hence it is independent of frequency fluctuations. It should also be noted that the double ramp control provided by the circuit of the present invention is an improvement upon the ramp and pedestal type control circuits of the prior art particularly in sensitivity to noise and line and load disturbances. This is due primarily to the fact that control function is an integrated function during the half cycle preceding the firing angle excursion or during the control cycle.

Having described this invention, that which is claimed as new is:

1. A circuit for controlling the firing of a controlled rectifier in accordance with the magnitude of a control signal comprising:
  (a) a controlled rectifier having an anode, a cathode and a gate electrode, the anode and cathode electrodes being connected in series with a source of alternating current so as to be forward biased on one half cycle of said alternating current and reversed biased on the other half cycle of said alternating current;
  (b) a capacitor;
  (c) first circuit means connected to said capacitor to charge said capacitor at a rate proportional to said control signal when said control rectifier is reversed biased;
  (d) switching means connected to be conductive when said controlled rectifier is forward biased and non-conductive when said controlled rectifier is reversed biased;
  (e) second circuit means connected to said capacitor by said switching means to charge said capacitor at a predetermined rate when said controlled rectifier is forward biased;
  (f) a triggering circuit connected between said capacitor and the gate of said controlled rectifier to supply a triggering pulse to said gate when the voltage on said capacitor reaches a predetermined value; and
  (g) third circuit means connected to said capacitor and controlled by said switching means for discharging said capacitor in response to the said switching means being rendered non-conductive.

2. A circuit as specified in claim 1 wherein said triggering circuit comprises transistor switching means with its input connected across the output of a bridge circuit including said capacitor as one of its arms.

3. A circuit as specified in claim 1 wherein said triggering circuit comprises a pair of complementary transistors connected in a bistable switching configuration with the input connected between said capacitor and a point of constant potential.

4. A circuit as specified in claim 1 wherein said third circuit means comprises a pair of complementary transistors connected in a bistable switching configuration in shunt across said capacitor with its input connected between said capacitor and a point the potential of which is controlled by said switching means.

5. A circuit for controlling the firing of a controlled rectifier in accordance with the magnitude of a control signal comprising:
  (a) a first pair of terminals adapted to be connected to a source of alternating current;
  (b) a controlled rectifier having anode, cathode and gate electrodes, the anode and cathode of said controlled rectifier being connected in series with said first pair of terminals so as to be forward biased on one half cycle of alternating current source and reverse biased on the other half cycle of said source;
  (c) a capacitor;
  (d) synchronous switching means connected to said first pair of terminals so as to be biased for conduction during the half cycle that said controlled rectifier is forward biased and non-conductive during the half cycle that said controlled rectifier is reversed biased;
  (e) a first charging path for said capacitor;
  (f) a source of constant potential connected to said capacitor through said first charging path by said synchronous switching means so as to charge said capacitor at a predetermined rate during the half cycle that said controlled rectifier is forward biased;

(g) a second pair of terminals adapted to be connected to a source of a control signal;

(h) a second charging path connecting said capacitor with said second terminals to charge the capacitor at a rate proportional to said control signal during the half cycle said controlled rectifier is reversed biased;

(i) a triggering circuit connected between said capacitor and the gate electrode of said controlled rectifier to deliver a firing pulse into said gate when the voltage on said capacitor reaches a predetermined value; and (j) circuit means connected to said capacitor and controlled by said switching means for discharging said capacitor in response to the said switching means being rendered non-conductive.

References Cited

UNITED STATES PATENTS

| | | | |
|---|---|---|---|
| 3,070,739 | 12/1962 | Hansen et al. | 307—252 |
| 3,184,672 | 5/1965 | Mason et al. | 307—252 |
| 3,243,689 | 3/1966 | Perrins | 307—252 |
| 3,262,045 | 7/1966 | Hauck | 307—252 |
| 3,296,419 | 1/1967 | Sels | 307—252 |
| 3,371,231 | 2/1968 | Burley | 307—252 |

JOHN S. HEYMAN, Primary Examiner

H. A. DIXON, Assistant Examiner

U.S. Cl. X.R.

307—294, 297, 313